United States Patent
Matsumoto (10) Patent No.: US 9,948,001 B2
(45) Date of Patent: Apr. 17, 2018

(54) PORTABLE TERMINAL

(71) Applicant: KYOCERA Corporation, Kyoto-shi, Kyoto (JP)

(72) Inventor: Takafumi Matsumoto, Osaka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/192,805

(22) Filed: Jun. 24, 2016

(65) Prior Publication Data

US 2016/0308274 A1    Oct. 20, 2016

Related U.S. Application Data

(63) Continuation of application No. PCT/JP2014/084056, filed on Dec. 24, 2014.

(30) Foreign Application Priority Data

Dec. 24, 2013  (JP) .................................. 2013-265922

(51) Int. Cl.
| | | |
|---|---|---|
| H01Q 1/24 | (2006.01) | |
| H01Q 1/44 | (2006.01) | |
| H01Q 1/36 | (2006.01) | |
| H01Q 1/40 | (2006.01) | |
| H01Q 9/42 | (2006.01) | |
| H04M 1/02 | (2006.01) | |

(52) U.S. Cl.
CPC ............... *H01Q 1/44* (2013.01); *H01Q 1/243* (2013.01); *H01Q 1/36* (2013.01); *H01Q 1/40* (2013.01); *H01Q 9/42* (2013.01); *H04M 1/0283* (2013.01); *H04M 1/026* (2013.01)

(58) Field of Classification Search
USPC .................................................. 343/702, 897
See application file for complete search history.

(56) References Cited

U.S. PATENT DOCUMENTS

| | | | |
|---|---|---|---|
| 7,656,357 B2 | 2/2010 | Ishibashi et al. | |
| 7,830,321 B2 | 11/2010 | Fukuchi | |
| 7,847,753 B2 * | 12/2010 | Ishibashi ................ | H01Q 1/243 343/702 |
| 8,115,681 B2 | 2/2012 | Ryou et al. | |
| 2007/0222694 A1 | 9/2007 | Fukuchi | |
| 2009/0051620 A1 | 2/2009 | Ishibashi et al. | |
| 2009/0140938 A1 | 6/2009 | Ishibashi et al. | |

(Continued)

FOREIGN PATENT DOCUMENTS

| | | |
|---|---|---|
| JP | 2007-259063 A | 10/2007 |
| JP | 2008-535372 A | 8/2008 |

(Continued)

OTHER PUBLICATIONS

International Search Report and Written Opinion of the International Searching Authority issued by the Japanese Patent Office for International Application No. PCT/JP2014/084056.

*Primary Examiner* — Jessica Han
*Assistant Examiner* — Hai Tran
(74) *Attorney, Agent, or Firm* — Procopio Cory Hargreaves and Savitch LLP (57) ABSTRACT

A portable terminal comprises a display and an antenna for wireless communication made of a metal. At least a part of the antenna includes a metallic decoration. The display and the metallic decoration are located in a manner visually recognizable from a specific surface.

4 Claims, 8 Drawing Sheets

(56) References Cited

U.S. PATENT DOCUMENTS

| | | |
|---|---|---|
| 2010/0048266 A1 | 2/2010 | Maruyama |
| 2010/0182210 A1 | 7/2010 | Ryou et al. |
| 2015/0038199 A1 | 2/2015 | Shiraishi |

FOREIGN PATENT DOCUMENTS

| | | |
|---|---|---|
| JP | 2008-535372 A | 8/2009 |
| JP | 2010-050548 A | 3/2010 |
| WO | 2006/115363 A1 | 2/2006 |
| WO | 2006/106982 A1 | 10/2006 |
| WO | 2006/115363 A1 | 11/2006 |
| WO | 2013/136398 A1 | 9/2013 |

* cited by examiner

PORTABLE TERMINAL

CROSS-REFERENCE TO RELATED APPLICATION

The present application is a continuation based on PCT Application No. PCT/JP2014/084056 filed on Dec. 24, 2014, which claims the benefit of Japanese Application No. 2013-265922 filed on Dec. 24, 2013. PCT Application No. PCT/JP2014/084056 is entitled "Mobile Terminal", and Japanese Application No. 2013-265922 is entitled "Portable Terminal". The content of which is incorporated by reference herein in their entirety.

FIELD

The present disclosure relates to a portable terminal including a wireless communication function.

BACKGROUND

In a portable terminal such as a smartphone, in order to prevent lowering in communication performance, an antenna for wireless communication is normally located around an upper end portion or a lower end portion on an inner side of a rear lid, which is a position at a distance from a metal object such as a circuit element or a battery.

Since portable terminals as described above are similar in size or shape, differentiation in design has become increasingly important as an appeal point to users. Differentiation in design is represented by an effect of a touch of class and a high quality feeling produced by a metallic decoration such as a logo drawn by vapor deposition of a metal on a rear surface of a transparent protection panel which covers such a display as a liquid crystal display.

SUMMARY

A portable terminal according to one embodiment comprises a display and an antenna for wireless communication made of a metal. At least a part of the antenna includes a metallic decoration. The display and the metallic decoration are located in a manner visually recognizable from a specific surface.

DETAILED DESCRIPTION

First Embodiment

Figure 1A:
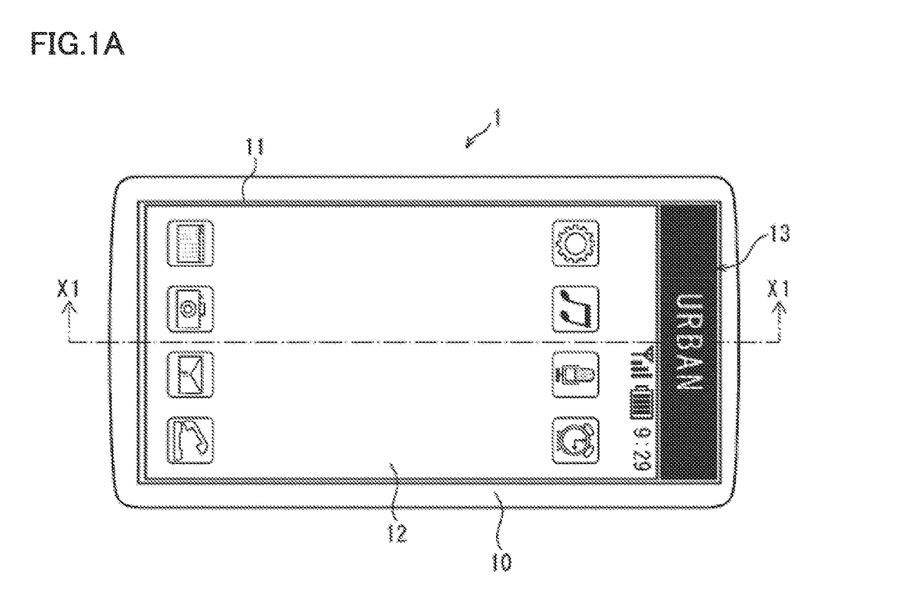
FIG. 1A is a top view showing appearance of a portable terminal according to a first embodiment.
Figure 1B:
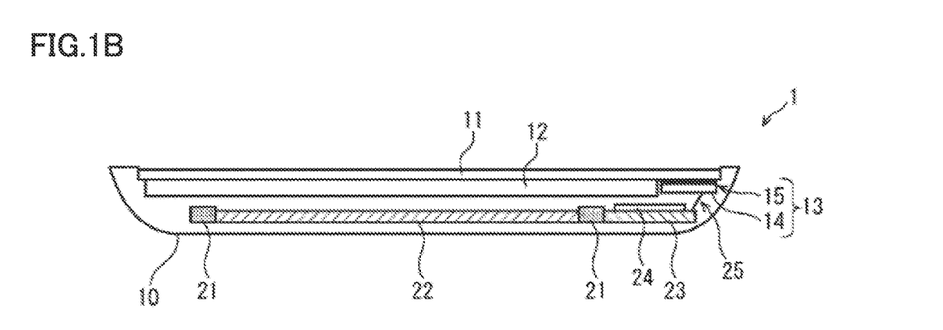
FIG. 1B is a cross-sectional view of the portable terminal shown in FIG. 1A along the line X1-X1.

A portable terminal 1 according to a first embodiment will be described below with reference to the drawings. Portable terminal 1 may include a portable telephone. As shown in FIGS. 1A and 1B, portable terminal 1 can contain a display 12, an antenna 13, a frame 21, a battery 22, a circuit substrate 23, a circuit element 24, and a power feed line 25 in a space formed by a panel 11 in a form of a transparent plate being secured to a housing 10 (hereinafter referred to as a "space in the housing"), the panel implementing a specific surface of portable terminal 1 including a plurality of surfaces. Housing 10 can be formed of a plastic resin. Panel 11 may be formed from a glass plate for protecting display 12.

Display 12 can include a liquid crystal display. In display 12, a surface where a liquid crystal panel showing an image is located (hereinafter referred to as a "screen surface") can be secured to a surface of panel 11 on an inner side of the housing (hereinafter referred to as a "rear surface of panel 11"). Securing can be achieved by an adhesive or a double-faced tape.

Frame 21 can be formed of a resin and can have a function to hold battery 22 and circuit substrate 23. Battery 22 can include a lithium ion battery and can have a function to feed power to each member requiring power feed such as display 12 and circuit element 24.

Circuit element 24 can include an electronic component such as a processor, an integrated circuit such as a communication unit which wirelessly communicates through antenna 13, an imaging element for a camera, a vibration motor, a memory, a capacitor, and a coil. Operations of portable terminal 1 can be controlled by execution of a program stored in a memory by a processor.

Figure 2:
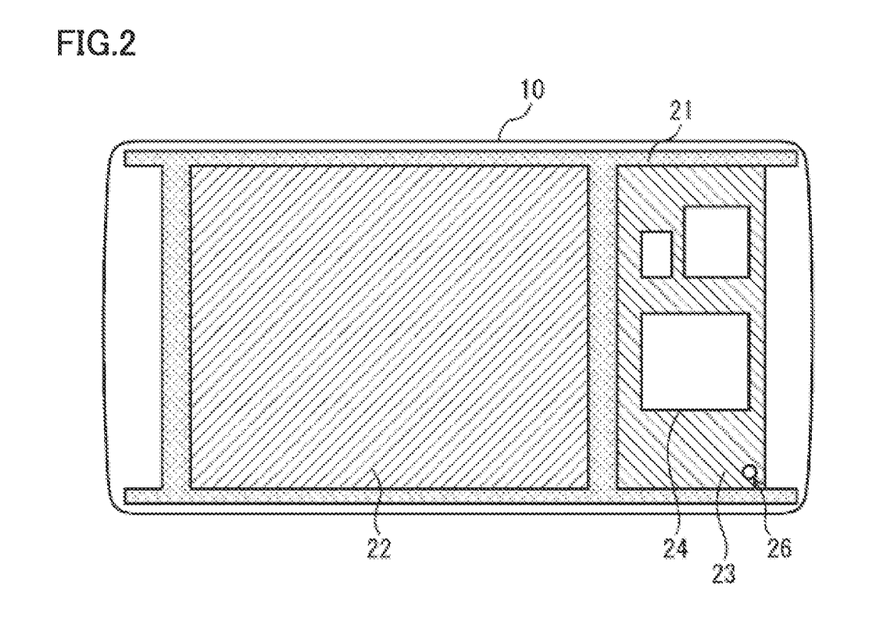
FIG. 2 is a diagram showing location of a substrate and the like in a housing of the portable terminal according to the first embodiment.

Circuit substrate 23 can include a printed board including a metal interconnection pattern formed on a substrate formed of a resin, and a plurality of electronic components such as circuit element 24 can be mounted thereon. Circuit substrate 23 can include a power feed line connection terminal 26 for connection of power feed line 25 (see FIG. 2). Power feed line connection terminal 26 can electrically be connected to a communication unit through a metal interconnection pattern formed on circuit substrate 23.

Figure 3A:
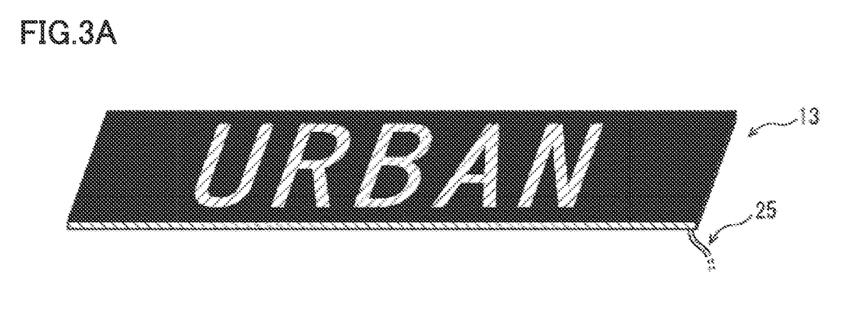
FIG. 3A is a perspective view showing an antenna according to the first embodiment.

Antenna 13 may include an antenna in a form of a flat plate for wireless communication over radio waves in a prescribed frequency band (800 MHz by way of example). An electric length of antenna 13 may be set to ¼ of a wavelength of radio waves used for wireless communication. On a first surface of antenna 13, a pattern including characters, graphics, and symbols can be formed as a decoration with a line of a metal. Specifically, on the first surface of antenna 13, characters "URBAN" can be formed with a line of a metal as shown in FIG. 3A.

Figure 3B:
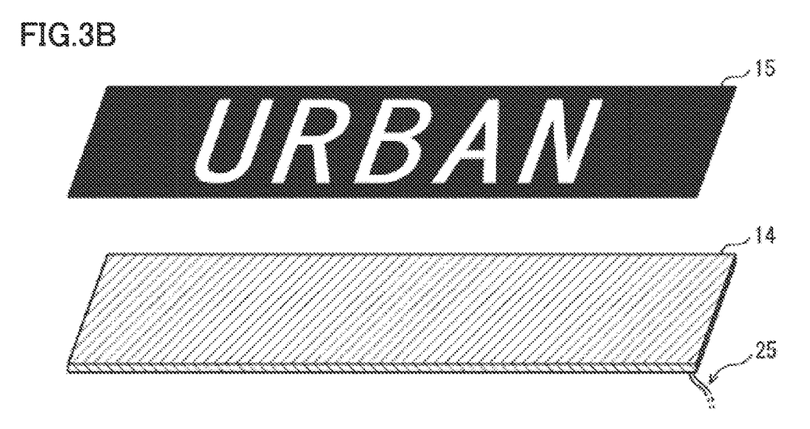
FIG. 3B is a diagram schematically showing a construction of the antenna in FIG. 3A.

As shown in FIG. 3B, antenna 13 can be formed from a coating 15 of a resin on a first surface of an antenna main body portion 14 of a metal material. In forming a coating, initially, a portion of the first surface of antenna main body portion 14 which should be exposed for forming the line of a metal described above may be masked in advance. For example, when characters "URBAN" are to be formed with a line of a metal as shown in FIG. 3A, a portion of the first surface of antenna main body portion 14 where characters "URBAN" are to be formed may be masked. Then, coating 15 can be formed on the masked first surface of antenna main body portion 14 and thereafter the mask can be removed. The metal material for antenna main body portion 14 in the masked portion is exposed, and this exposed portion may form the line of the metal described previously (the characters "URBAN" by way of example).

In antenna 13, a surface where a decoration described above is formed (hereinafter referred to as a "decorated surface") can be secured to a portion of the rear surface of panel 11 where display 12 is not secured. Therefore, as shown in FIG. 1A by way of example, the decorated surface of antenna 13, together with the screen surface of display 12, can visually be recognized from the outside of portable terminal 1 through panel 11.

One end of power feed line 25 can be connected to one end portion of antenna main body portion 14 and the other end of power feed line 25 can be connected to power feed line connection terminal 26. With such connection, a communication unit and antenna 13 are electrically connected to each other and wireless communication through antenna 13 by the communication unit can be established.

As described above, in portable terminal 1, instead of a metallic decoration separately located from the antenna by drawing a logo with vapor deposition of a metal on the rear surface of panel 11, the antenna can be constructed such that the metal material for antenna 13 itself forms a part of the metallic decoration. Therefore, since the metallic decoration does not serve as a shield plate against radio waves transmitted from the antenna in portable terminal 1, lowering in communication function due to the metallic decoration serving as the shield plate can be prevented. Since the decorated surface of antenna 13 can visually be recognized from a first surface of portable terminal 1, a user who sees portable terminal 1 can feel a touch of class and a high quality feeling produced by the metallic decoration.

2. Second Embodiment

Figure 4A:
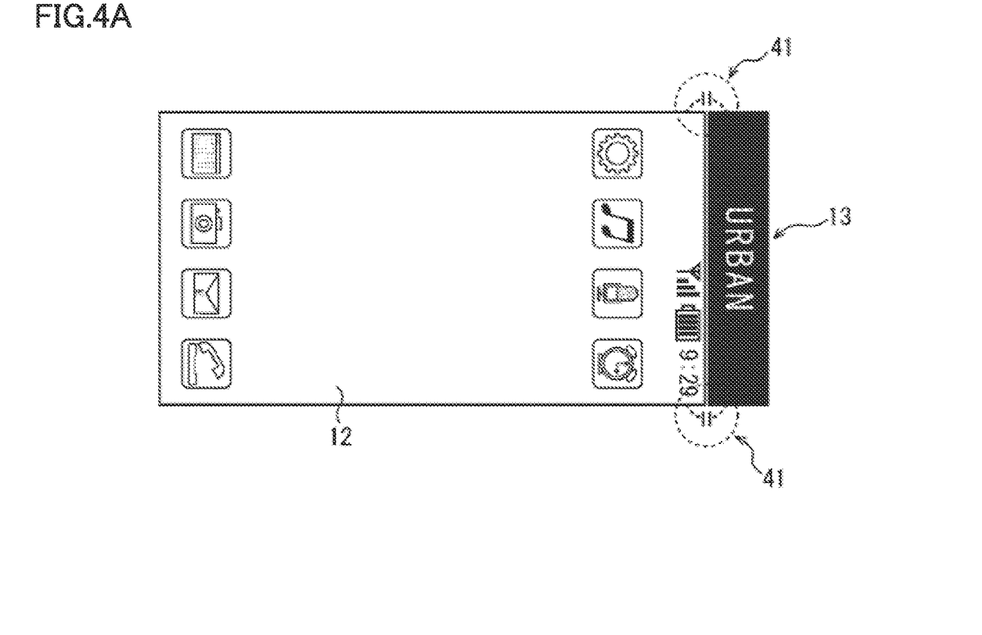
FIG. 4A is a diagram showing positional relation between the antenna and a display and capacitive coupling according to the first embodiment.

In the first embodiment described above, antenna 13 is secured to the rear surface of panel 11. In this case, as shown in FIG. 4A, antenna 13 and display 12 can be located in proximity to each other. When antenna 13 and display 12 are located in proximity to each other, capacitive coupling between antenna 13 and display 12 (see a capacitance 41 in FIG. 4A) may take place. Then, an electric length of antenna 13 may become shorter and a resonance frequency of antenna 13 configured to be as high as a frequency of radio waves used for wireless communication may drift.

Figure 4B:
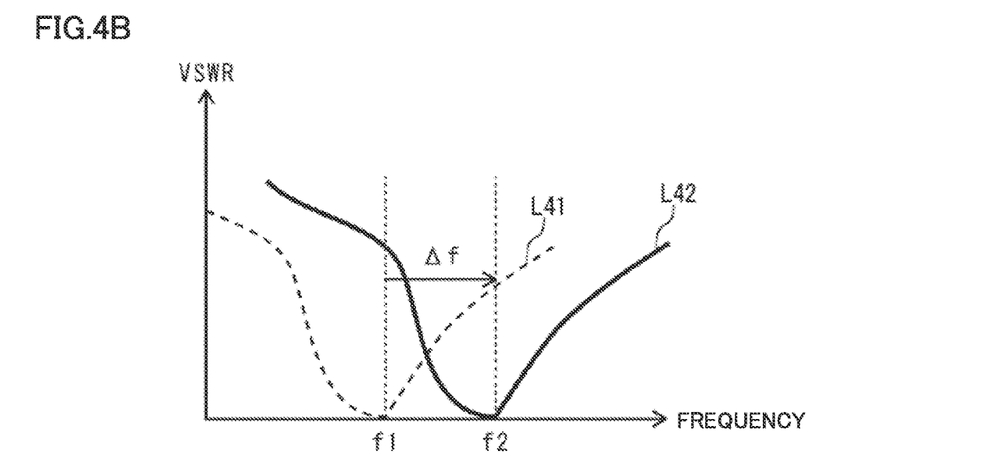
FIG. 4B is a diagram showing correspondence between a frequency of the antenna and VSWR.

FIG. 4B shows correspondence between a frequency associated with antenna 13 and VSWR. The abscissa in FIG. 4B represents a frequency and the ordinate represents a voltage standing wave ratio (VSWR). A graph L41 shows correspondence between a frequency and VSWR when there is no capacitive coupling, and a graph 42 shows a case that capacitive coupling takes place. A resonance frequency in the case that there is no capacitive coupling is shown with f1 at which VSWR is at a minimal value in graph L41. f1 corresponds to a frequency of radio waves used for wireless communication. A resonance frequency in the case that capacitive coupling takes place is shown with f2 at which VSWR is at a minimal value in graph L42. As capacitive coupling takes place, the resonance frequency drifts from f1 by $\Delta f$ and communication performance lowers.

Figure 5A:
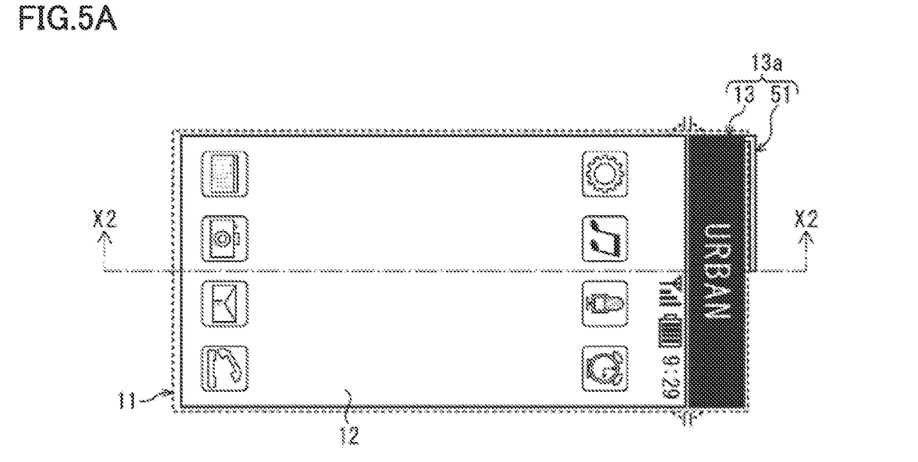
FIG. 5A is a diagram showing positional relation between the antenna and the display and capacitive coupling according to a second embodiment.
Figure 5C:
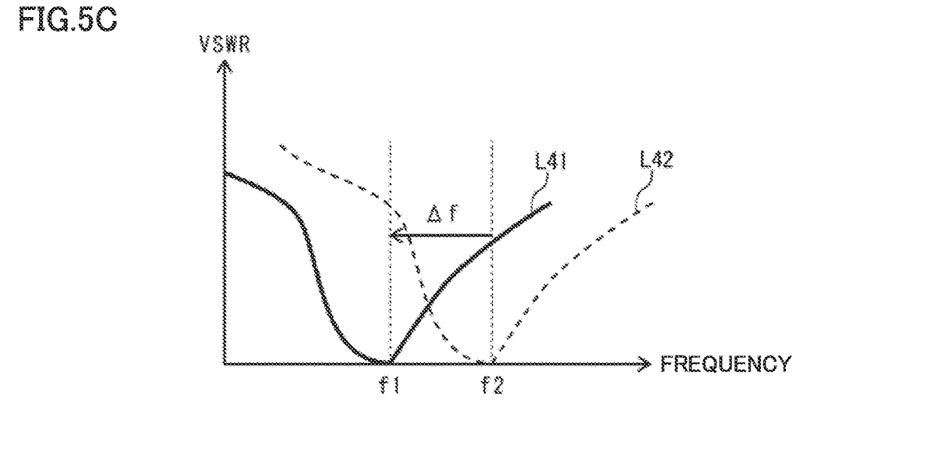
FIG. 5C is a diagram showing correspondence between a frequency of the antenna and VSWR.
Figure 6A:
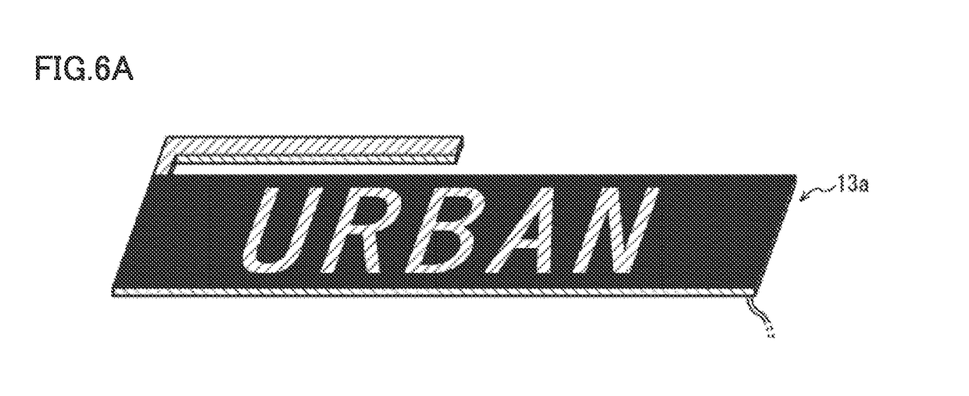
FIG. 6A is a perspective view showing an antenna according to a modification.
Figure 6B:
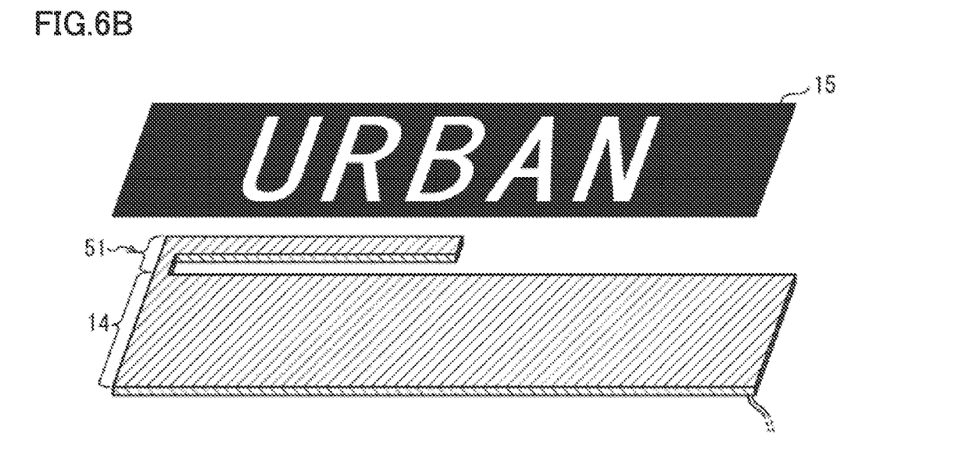
FIG. 6B is a diagram schematically showing a construction of the antenna in FIG. 6A.

In order to prevent lowering in communication performance, in the second embodiment, an antenna 13a instead of antenna 13 is employed as shown in FIG. 5A. As shown in FIGS. 6A and 6B, antenna 13a is implemented by adding an antenna extension portion 51 to antenna 13 in the first embodiment, and it is an antenna in a form of a rectangular U-shaped plate made of a metal which is the same as a material for antenna 13. Antenna extension portion 51 is in a form of an L-shaped plate and can be formed integrally with antenna main body portion 14. Antenna extension portion 51 corresponds to a decrease in electric length of antenna 13 caused by capacitive coupling which takes place between antenna main body portion 14 and display 12. Antenna extension portion 51 in antenna 13a can compensate for an electric length of the antenna which is decreased by capacitive coupling described above. Therefore, a natural frequency of antenna 13a is set to f which is as high as the frequency of radio waves used for wireless communication (see FIG. 5C).

As set forth above, the portable terminal according to the second embodiment can compensate for drift of a resonance frequency caused by capacitive coupling described above, by employing antenna 13a including antenna extension portion 51 instead of antenna 13. The portable terminal according to the second embodiment can achieve prevention of lowering in communication performance due to an influence by capacitive coupling as described above.

3. Modification

The exemplified portable terminal can also be modified as below, and the present disclosure is naturally not limited to the portable terminal as shown in an embodiment described above.

Figure 5B:
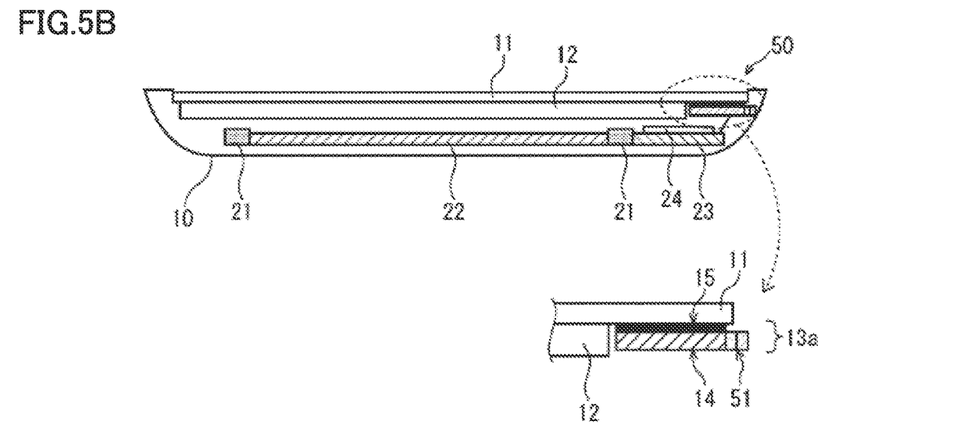
FIG. 5B is a cross-sectional view of the portable terminal shown in FIG. 5A along the line X2-X2.

(1) In the second embodiment, positional relation between display 12 and antenna extension portion 51 is not particularly mentioned. As shown in FIG. 5B, however, antenna extension portion 51 can be located in a direction away from display 12 when viewed from antenna main body portion 14, because capacitive coupling may be likely between antenna extension portion 51 and display 12 when antenna extension portion 51 is located at a position proximate to display 12. When capacitive coupling takes place, an electric length of antenna 13a becomes shorter and communication performance is lowered. By antenna extension portion 51 located in a direction away from display 12 when viewed from antenna main body portion 14, occurrence of capacitive coupling between antenna extension portion 51 and display 12 can be prevented so that lowering in communication performance can be avoided.

(2) In the first embodiment, the decorated surface in antenna 13 is such that a metal material for antenna main body portion 14 exposed through a hollow portion in coating 15 forms a pattern of a metal. The decorated surface, however, should only be obtained by surface treatment for exposing at least a part of the metal material for antenna 13.

For example, the first surface of antenna 13 may be engraved for forming a pattern. The decorated surface may be such that a pattern is formed through vapor deposition of a metal on the first surface of antenna 13. In this case, the metal material for antenna 13 is exposed in a portion of the decorated surface other than a portion where the pattern is formed. Though the modification of the decorated surface of antenna 13 has been described above, such description is also similarly applicable to the decorated surface of antenna 13a in the second embodiment.

(3) Though a single antenna may be located such that the decorated surface is externally visually recognizable in the first embodiment, a plurality of antennas may be located. In this case, respective decorated surfaces of the plurality of antennas should only be located in an externally visually recognizable manner. A portable terminal 2 in which two antennas are located will be described below by way of example of the plurality of antennas.

Figure 7A:
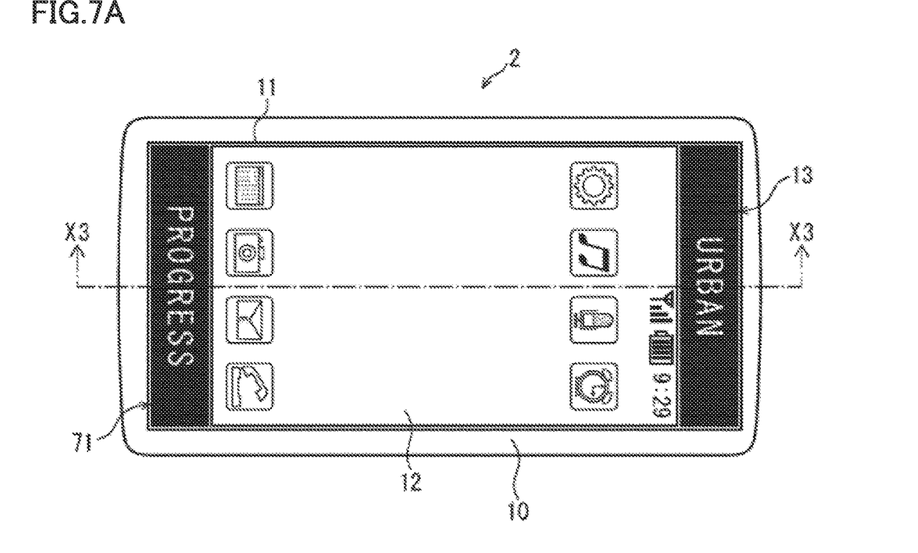
FIG. 7A is a top view showing appearance of a portable terminal according to the modification.
Figure 7B:
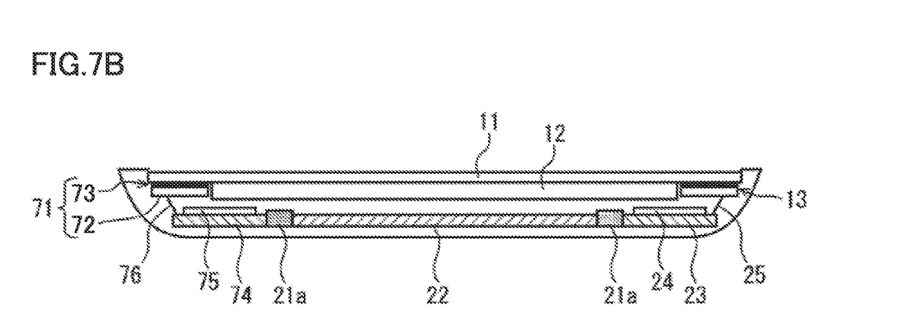
FIG. 7B is a cross-sectional view of the portable terminal shown in FIG. 7A along the line X3-X3.

As shown in FIG. 7A, portable terminal 2 can include antenna 13 located on an upper end side of the screen surface and an antenna 71 constructed similarly to antenna 13 and located on a lower end side of the screen surface, with the screen surface of display 12 lying therebetween. Portable terminal 2 can contain in the space in the housing, a frame 21a, antenna 71, a circuit substrate 74, a circuit element 75, and a power feed line 76, in addition to display 12, antenna 13, battery 22, circuit substrate 23, circuit element 24, and power feed line 25 included in portable terminal 1.

Frame 21a is a modification of frame 21 in portable terminal 1 which holds circuit substrate 23 and battery 22, for further holding also circuit substrate 74. Circuit element 75 may include an electronic component such as an integrated circuit such as a communication unit for wireless communication through antenna 71, a capacitor, and a coil. Circuit substrate 74 can include a printed board including a metal interconnection pattern formed on a substrate formed of a resin, and a plurality of electronic components such as circuit element 75 can be mounted thereon. Circuit substrate 74 can include a not-shown power feed line connection terminal for connection of power feed line 76. The power feed line connection terminal can electrically be connected to a communication unit through a metal interconnection pattern formed on circuit substrate 74.

Antenna 71 may include an antenna made of a metal in a form of a flat plate for wireless communication over radio waves in a prescribed frequency band (1.5 GHz by way of example). An electric length of antenna 71 can be set to ¼ of a wavelength of radio waves used for communication. Antenna 71 can be obtained by forming a coating 73 on a first surface of an antenna main body portion 72 with the technique similarly for coating 15 in antenna 13.

On the first surface of antenna 71, a pattern including characters, graphics, and symbols can be formed as a decoration with a line of a metal. By way of example, on the first surface of antenna 71, characters "PROGRESS" can be formed with a line of a metal as shown in FIG. 7A, with the technique similar to that in forming characters "URBAN" in antenna 13.

In antenna 71, a decorated surface thereof can be secured to a portion on the rear surface of panel 11 where neither of display 12 and antenna 13 is secured. Therefore, as shown in FIG. 7A by way of example, the decorated surface of antenna 71, together with the screen surface of display 12 and the decorated surface of antenna 13, can visually be recognized from the outside of portable terminal 2 through panel 11.

One end of power feed line 76 can be connected to one end portion of antenna main body portion 72 in antenna 71 and the other end of power feed line 76 can be connected to the power feed line connection terminal in circuit substrate 74. With such connection, a communication unit representing one circuit element 75 and antenna 71 are electrically connected to each other and wireless communication through antenna 71 by the communication unit can be established.

Though characters "URBAN" are formed in antenna 13 and characters "PROGRESS" are formed in antenna 71 in embodiments and a modification described above, these characters are shown by way of example and characters to be formed are not limited thereto.

(4) In the modification (3), antenna 71 and antenna 13 are secured to the rear surface of panel 11. In this case, when antenna 13 and display 12 are located in proximity to each other as described in the second embodiment, capacitive coupling may take place between antenna 13 and display 12. Then, an electric length of antenna 13 becomes shorter, a resonance frequency of antenna 13 varies, and performance of wireless communication through antenna 13 is lowered. In order to prevent lowering in communication performance, antenna 13a obtained by adding antenna extension portion 51 to antenna 13 is employed in the second embodiment.

Figure 8A:
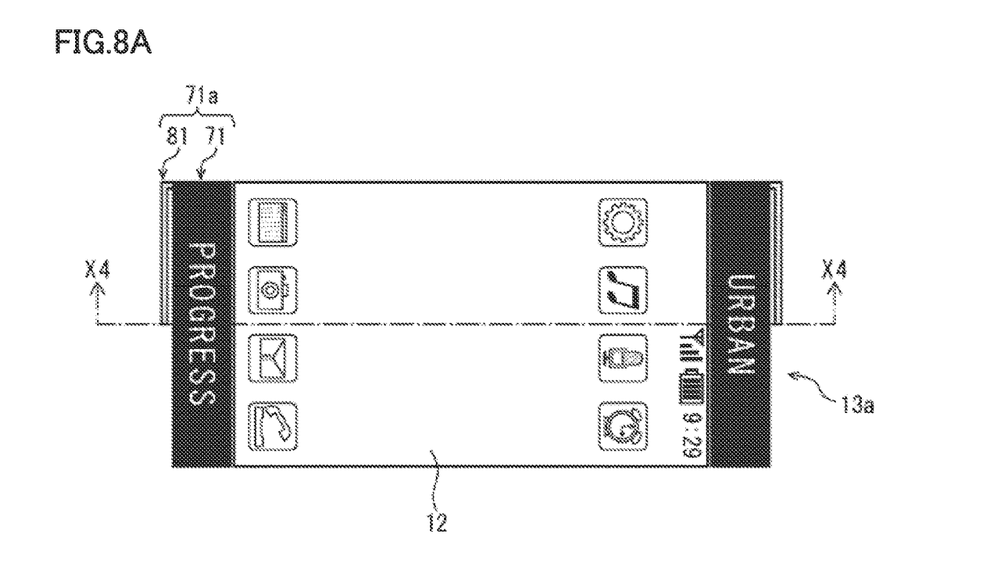
FIG. 8A is a diagram showing positional relation between the antenna and the display in the portable terminal according to the modification.
Figure 8B:
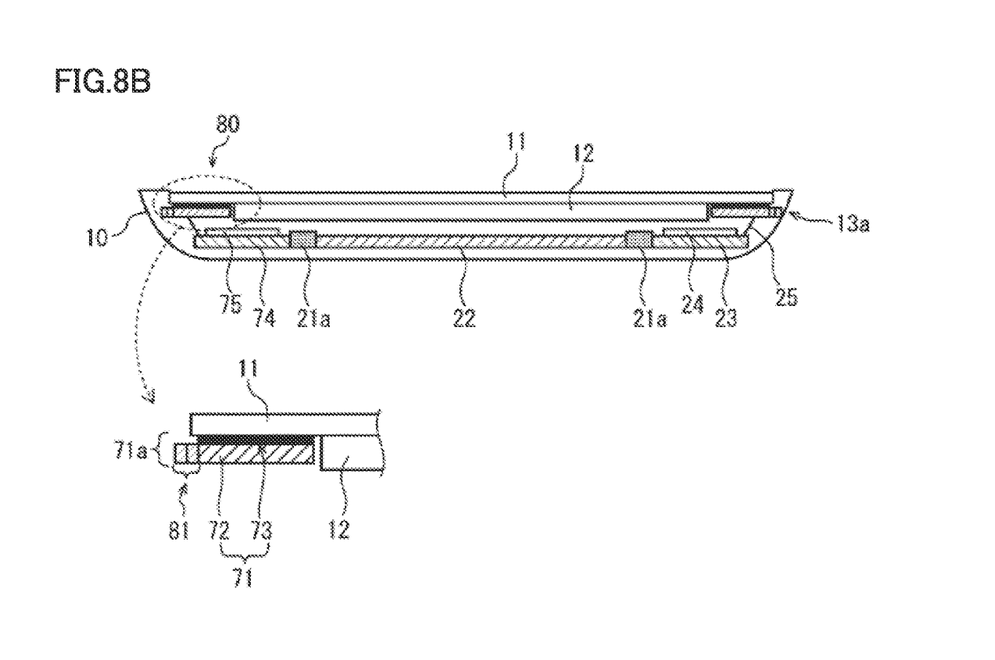
FIG. 8B is a cross-sectional view of the portable terminal shown in FIG. 8A along the line X4-X4.

Similarly to the case of antenna 13 and display 12, when antenna 71 and display 12 are located in proximity to each other as well, capacitive coupling may take place between antenna 71 and display 12. Then, an electric length of antenna 71 becomes shorter, a resonance frequency of antenna 71 varies, and performance of wireless communication through antenna 71 is lowered. In the present modification, in order to prevent such lowering in communication performance, an antenna 71a constructed similarly to antenna 13a can be employed instead of antenna 71 as shown in FIGS. 8A and 8B.

Antenna 71a is implemented by adding an antenna extension portion 81 to antenna 71, and it is an antenna in a form of a rectangular U-shaped plate made of a metal which is the same as a material for antenna 71. Antenna extension portion 81 is in a form of an L-shaped plate and can be formed integrally with antenna main body portion 72. Antenna extension portion 81 corresponds to a decrease in electric length of antenna 71 caused by capacitive coupling which takes place between antenna main body portion 72 and display 12. Antenna extension portion 81 in antenna 71a can compensate for an electric length of the antenna which is decreased by capacitive coupling described above. Therefore, a natural frequency of antenna 71a is as high as the frequency of radio waves used for wireless communication.

As set forth above, the portable terminal according to the present modification can compensate for drift of a resonance frequency caused by capacitive coupling which takes place between antenna main body portion 72 and display 12, by employing antenna 71a including antenna extension portion 81 instead of antenna 71. Lowering in communication performance due to an influence by capacitive coupling as described above can be prevented.

(5) In the modification (4), positional relation between display 12 and antenna extension portion 81 is not particularly mentioned. As shown in FIG. 8B, however, antenna extension portion 81 can be located in a direction away from display 12 when viewed from antenna main body portion 72, because capacitive coupling may be likely between antenna extension portion 81 and display 12 when antenna extension portion 81 is located at a position proximate to display 12. When capacitive coupling takes place, an electric length of antenna 71a becomes shorter and communication performance is lowered. By antenna extension portion 81 located in a direction away from display 12 when viewed from antenna main body portion 72, capacitive coupling between antenna extension portion 81 and display 12 can be lessened so that lowering in communication performance can be prevented.

(6) Though portable terminal 1 may include a portable telephone by way of example in the first and second embodiments and each modification, a terminal device should only be such that a decorated surface is visually recognizable from the outside of a portable terminal, the decorated surface being constructed such that a metal material for an antenna itself forms a part of a metallic decoration. For example, portable terminal 1 may include a smartphone, a table terminal device, or a tablet personal computer.

(7) Though the antenna extension portion (51, 81) is in a form of an L-shaped plate in the second embodiment and each modification, the antenna extension portion should only be able to compensate for an electric length decreased by capacitive coupling between display 12 and the antenna main body portion (14, 72). For example, the antenna extension portion (51, 81) may be formed as being curved, for example, by a plate in a form of an arc.

(8) Though housing 10 is formed of a plastic resin in the first and second embodiments and each modification, it may be formed of a light-weight material such as a magnesium alloy. Though panel 11 is formed from a glass plate, it should only be formed from such a member that the screen surface of display 12 and the decorated surface of antennas 13, 13a, 71, and 71a is visually recognizable from the outside of portable terminals 1 and 2 through panel 11. For example, panel 11 may be formed of plastics or from a member including a function to accept an input operation, such as a touch panel.

Though display 12 may include a liquid crystal display, it should only include a device including a function to show an image. For example, an organic EL display may be included the display.

Though frames 21 and 21a are formed of a resin, it should only be formed of a material which can hold a member such as battery 22 and circuit substrate 23. For example, the frame may be formed of a metal such as aluminum.

(9) Though antenna 13 and antenna 13a are used for wireless communication over radio waves in a 800 MHz band by way of example in the first and second embodiments, they may be employed for communication over radio waves in other frequency bands. Though antenna 71 and antenna 71a are used for wireless communication over radio waves in a 1.5 GHz band by way of example in the modifications (3) to (5), they may be employed for communication over radio waves in other frequency bands.

(10) Each functional component (circuit element 24 and circuit element 75) shown in the first and second embodiments and each modification may be implemented by a circuit executing the function or by execution of a program by one processor or a plurality of processors.

(11) Embodiments and each modification described above may partially be combined.

The portable terminal according to one embodiment is suitable as a terminal such as a portable telephone or a smartphone which produces a touch of class and a high quality feeling.

The invention claimed is:

1. A portable terminal comprising:
   a display; and
   an antenna for wireless communication made of a metal material, wherein the antenna has an antenna main body portion in a form of a rectangular plate and an antenna extension portion in a form of an L-shaped plate which are formed integrally with each other, and wherein an electric length of the antenna extension portion corresponds to a decrease in electric length of the antenna main body portion caused by capacitive coupling between the display and the antenna main body portion,
   at least a part of the antenna including a metallic decoration, and
   the display and the metallic decoration being located in a manner visually recognizable from a specific surface.

2. The portable terminal according to claim 1, wherein the antenna extension portion is located in a direction away from the display when viewed from the antenna main body portion.

3. The portable terminal according to claim 1, wherein
   at least a partial region of a first surface of the antenna main body is subjected to surface treatment for exposing at least a part of the metal material for the antenna, and
   the metallic decoration includes a portion where at least the part of the metal material is exposed.

4. The portable terminal according to claim 3, wherein the portion where the metal material is exposed produces a pattern by a coating formed in a portion other than the portion where the metal material is exposed in the region subjected to the surface treatment.

* * * * *